United States Patent [19]

Carpenter

[11] Patent Number: 5,711,032
[45] Date of Patent: Jan. 27, 1998

[54] LOCKING APPARATUS FOR A DRAW CORD

[76] Inventor: Jake Carpenter, Rte. 7 North, Manchester Center, Vt. 05255

[21] Appl. No.: 540,508

[22] Filed: Oct. 10, 1995

Related U.S. Application Data

[63] Continuation of Ser. No. 288,145, Aug. 9, 1994, abandoned.
[51] Int. Cl.⁶ .................... A41D 19/01; F16G 11/00
[52] U.S. Cl. .................... 2/158; 2/336; 2/159; 2/161.1; 24/115 G
[58] Field of Search .................... 24/115 G; 2/158, 2/159, 336, 337, 341, 161.1

[56] References Cited

U.S. PATENT DOCUMENTS

| | | | |
|---|---|---|---|
| 4,769,874 | 9/1988 | Tracy | 24/115 X |
| 4,945,849 | 8/1990 | Morris et al. | 24/115 G X |
| 5,197,166 | 3/1993 | Meier et al. | 24/115 G |
| 5,224,245 | 7/1993 | Matoba | 24/115 G |
| 5,263,202 | 11/1993 | Siberell | 2/158 X |

*Primary Examiner*—C. D. Crowder
*Assistant Examiner*—Shirra L. Jenkins
*Attorney, Agent, or Firm*—Wolf, Greenfield & Sacks, P.C.

[57] ABSTRACT

A locking apparatus for a cord comprises a sleeve member having a first axial end, a second axial end and a tubular surface therebetween. The first axial end is closed by a disc-shaped member having a first diameter. The tubular surface has an outer surface having a second diameter. The second axial end has a flange-shaped rim portion having a third diameter. The first diameter and the third diameter are greater than the second diameter. The disc-shaped member has an outer surface that is knurled. A plug shaped member is slidably received in the sleeve member. The plug-shaped member has a first axial end disposed with the sleeve member and a second axial end being disposed axially outside of sleeve member. The second axial end has a knurled surface.

37 Claims, 1 Drawing Sheet

5,711,032

LOCKING APPARATUS FOR A DRAW CORD

This application is a continuation of application Ser. No. 08/288,145, filed Aug. 9, 1994 now abandoned.

FIELD OF THE INVENTION

The present invention relates to a locking apparatus for a draw cord. More specifically, the present invention relates to an article of clothing, such as a mitten or glove, that includes a locking apparatus for a draw cord that is threadably received in a hem portion of the clothing article.

BACKGROUND OF THE INVENTION

An example of a prior art locking apparatus for a draw cord is illustrated in FIG. 4. The lock apparatus conventionally includes a hollow sleeve member and plug insert that are attached to a glove by a pair of loop-shaped straps. Conventionally, the loops are wrapped around the outer cylindrical surface of a sleeve portion of the locking apparatus. The ends of the loops are stitched to the outer surface of a hem portion of a glove. A cord is threadably received in the hem portion and its ends extend out of the hem through a slot in the hem. The ends of the draw cord then extend through a radial bore in the locking apparatus. Thus, when a user pulls on the ends of the draw cord, to tighten the end of the glove about the wrist, the line of forces created by the draw cord and the straps actually work against each other and therefore extra effort is required to tighten the glove sleeve about the users wrist.

In the prior art locking apparatus, the axial ends have a smooth outer surface, which can cause the user's hands to slide off these axially ends when the user attempts to release the tension on the draw cord by squeezing or compressing on the axial ends. This is especially true in wet and slippery conditions, which are quite frequently seen during the normal use of the glove. In addition, the axial ends of the sleeve shaped member are flush with respect to the central portion of the sleeve. In other words, the axial ends do not include a flange-shaped rim. Therefore, the loop-shaped straps which attach the locking apparatus to the glove often slide off their respective axial ends of the locking apparatus, causing the locking apparatus to become displaced with respect to the glove. In addition, the loop-shaped strap will become lodged between the hollow sleeve and the plug insert to prevent actuation of the locking apparatus to relieve the tension on the draw cord.

SUMMARY OF THE INVENTION

Accordingly, it is an object of the present invention to provide a locking apparatus that permits, during a tightening operation, tension to be applied to the draw cord in concert with the lines of force created by the straps due to the placement of the straps about the housing of the sleeve. It is a further object of the present invention to provide flange-shaped members on the first and second axial ends of the sleeve to prevent the loop-shaped straps from becoming displaced with respect to the locking apparatus and to prevent the loop-shaped straps from interfering with the normal use of the locking apparatus. It is a further object of the present invention to provide a locking apparatus for a cord comprising, a hollow sleeve member having a first axial end, a second axial end and a tubular surface therebetween. The first axial end is closed by a disc-shaped member having a first diameter. The tubular surface has an outer surface having a second diameter. The second axial end has a flange-shaped rim portion having a third diameter. The first diameter and the third diameter are greater in dimension than the second diameter. The disc-shaped member has an outer surface that is knurled. A plug shaped member is slidably received in the sleeve member. The plug-shaped member has a first axial end disposed within the sleeve member and a second axial end disposed axially outside of the sleeve member. The second axial end has an outer surface that is knurled.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EMBODIMENTS

Figure 1:
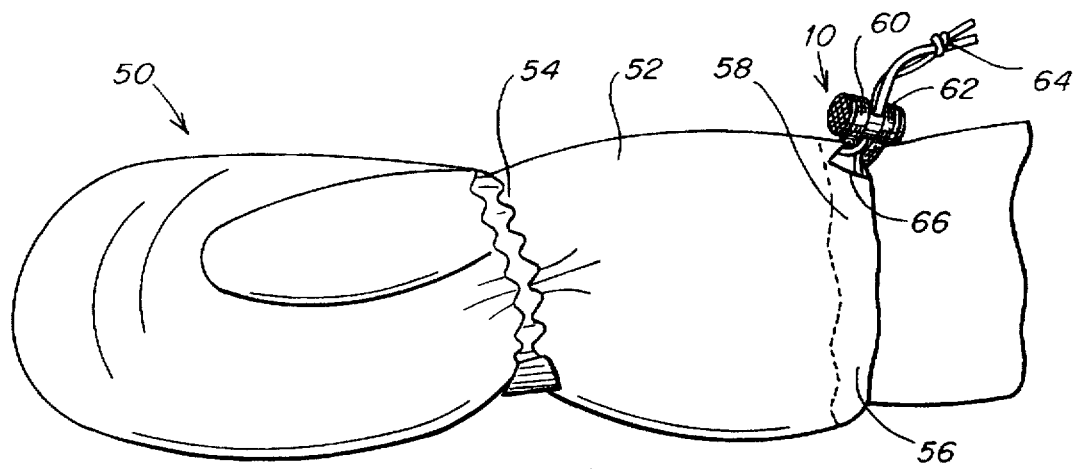
FIG. 1 is a perspective view of a mitten using a locking apparatus for a draw cord according to the present invention.
Figure 2:
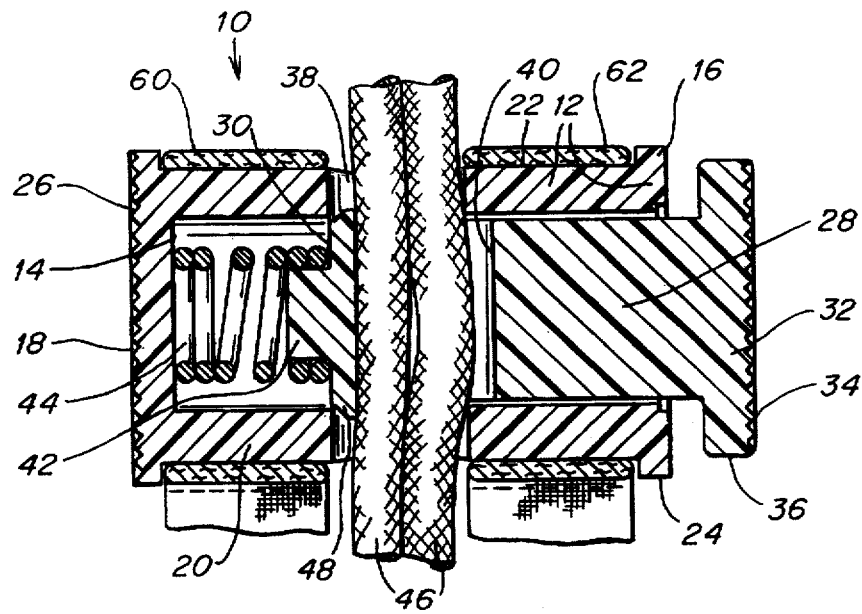
FIG. 2 is a cross-sectional view of the locking apparatus according to the present invention.

Referring now to FIGS. 1 and 2, a locking apparatus 10 according to the present invention is illustrated. The locking apparatus 10 includes a hollow sleeve member 12 that has a first axial end 14 and a second axial end 16. The first axial end 14 is closed by disc-shaped member 18, which forms a flange shaped rim, that has a first predetermined diameter. A tubular body 20 is disposed between the first axial end 14 and the second axial end 16 of sleeve member 12. Tubular surface 20 has an outer surface 22 that has a second predetermined diameter. Second axial end 16 has a flange shaped rim portion 24 that has a third predetermined diameter. The first diameter of the first axial end 14 and the second diameter of the second axial end 16 are of approximately equal size and are greater in size than the second diameter of the outer surface 22 of the sleeve member 12. In addition, disc-shaped member 18 has an outer surface 26 that is knurled.

A plug-shaped member 28 is slidably received in sleeve member 12. Plug-shaped member 28 has a first axial end 30 disposed within sleeve member 12 and a second axial end 32 disposed axially outside of sleeve 12. The second axial end 32 has an outer surface 34 which is knurled. The second axial end of the plug member has a flange-shaped rim portion 36 that has a fourth predetermined diameter. The fourth diameter is approximately of equal size with respect to the second diameter. Thus, the disc-shaped member 18 and the flange-shaped rim portion 24 form a pair of first and second members extending outwardly from the outer surface 22 of the tubular body 20.

Sleeve 12 has a radially extending through bore 38. The plug member 28 also has a radially extending through bore 40, which aligns with through bore 38 inside of sleeve member 12. The first axial end of plug member 28 can include a central axial projection 42 extending outwardly from the first axial end 30. A spring 44 is disposed within the sleeve member 12 and is located between the first axial end 14 of the sleeve member 12 and the first axial end 30 of the plug member 28 and is disposed about the axial projection 42. Spring 44 biases plug member 28 out of sleeve housing 12. A draw cord 46 is threadably disposed through the radial bores 38, 40. Cord 46 thus prevents plug 28 from being removed from the sleeve housing. However, if the cord 46 were not threadably disposed through the radial through bores 38, 40, a radial projecting stop 48, disposed on plug member 28, will abut the bore 38 to prevent plug 28 from being removed from the sleeve housing.

The locking apparatus of the present invention can be used in various types of devices where draw cords are conventionally used, including articles of clothing such as, for example, a mitten or glove 50 (only a mitten is illustrated in FIG. 1 for the sake of brevity). Mitten 50 includes a sleeve portion 52 that has a first axial end 54 connected to the mitten 50, and a second axial end 56 that has a hem portion 58. Hem portion 58 has an open slot 66 to permit the draw cord to be threaded within the hem and to extend out of the open slot. A pair of loop shaped straps 60, 62 are connected, preferably by stitching, to the inner cylindrical surface of the sleeve 52 adjacent to hem 58. The loop shaped strap 60 is preferably disposed on one side of the open slot and the other strap 62 is preferably disposed on the other side of the open slot. Each of the loop straps 60, 62 are disposed about the outer surface 22 of the sleeve member 12 to connect the locking apparatus to the mitten. Strap 60 is disposed between the first axial end 18 of sleeve member 12 and radial through bore 38. Strap 62 is disposed about the outer surface 22 of the sleeve member 12 between the second axial end 16 and radial through bore 38. Thus, the disc-shaped member 18 and the flange-shaped rim portion 24 act as means for maintaining an axial position of the loop shaped straps 60, 62 on the sleeve member 12.

Figure 3:
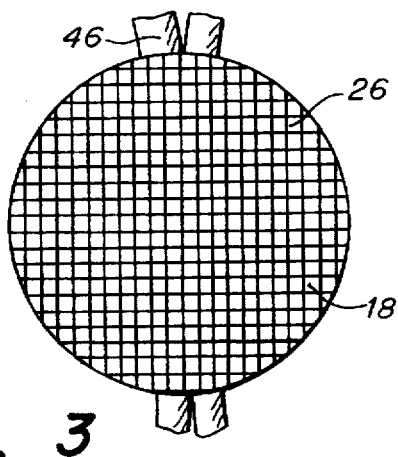
FIG. 3 is a side view of the locking apparatus illustrated in FIG. 2.
Figure 4:
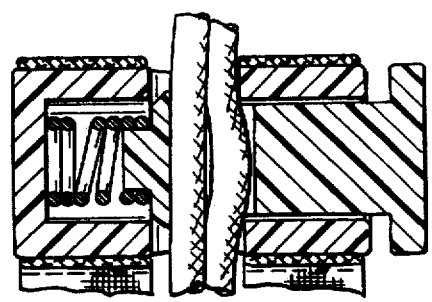
FIG. 4 is a sectional view of a prior art locking apparatus.

The operation of the locking apparatus in connection with the mitten shown in FIG. 1 will be described below with reference to FIGS. 1-3. The user first places the mitten on the hand. The user will then pull on the ends 64 of the pull cord 46 to tighten the second end 56 of the sleeve 52 about the users wrist. By simple pulling on the end 64 of the cord 46, hem portion 56 is automatically tightened about the wrist to the desired degree. By advantageously placing the strap 60, 62 on the inner cylindrical surface of the sleeve, 51, the operation of pulling on the end 64 of the cord 46 actually facilitates the tightening process for the draw cord because the lines of force created by the draw cord and the straps are substantially parallel. In other words, the straps 60, 62 and the cord 46 actually work in concert with one another to facilitate the tightening of the cord. Once the desired tension has been reached, the spring 44 will maintain sufficient pressure on the draw cord to maintain the cord 46 in a fixed relationship with respect to the locking apparatus 10. To release the tension on the draw cord 46, the user will simple grab the two knurled surfaces 26, 34 and squeeze axially in on the locking apparatus. Such a compressing action will eventually overcome the biasing pressure from spring 44 and will displace the plug into the sleeve shaped housing to release the tension on the draw cord 46. The user can now take the mitten off freely.

Having described the presently preferred exemplary embodiment of a new and improved locking apparatus for a draw cord, in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

I claim:
1. An article of clothing, comprising:
a first sleeve having a first axial end and a second axial end, said first sleeve having an inner surface and an outer surface;
at least one loop-shaped strap connected to the inner surface of said first sleeve;
a draw cord disposed about the second axial end of said first sleeve and extending outwardly therefrom; and
a locking apparatus that releasably locks the draw cord, the locking apparatus comprising;
a second sleeve having a first axial end and a second axial end, said first axial end being closed and having a first diameter, said second sleeve including a body with an outer surface having a second diameter, said outer surface of said body being adapted to receive the at least one loop-shaped strap, said second axial end of said second sleeve having a flange-shaped rim portion having a third diameter, said first diameter and said third diameter being greater than said second diameter; and
a plug slidably received in said second sleeve, said plug having a first axial end disposed within said second sleeve and a second axial end disposed outside of said second sleeve.

2. The article of clothing according to claim 1, wherein said second axial end of said plug has a flange-shaped rim portion.

3. The article of clothing according to claim 1, wherein said closed end of said second sleeve and second axial end of said plug each has an outer surface, and wherein at least one of the outer surfaces of said closed end of said second sleeve and said second axial end of said plug is knurled.

4. The article of clothing according to claim 1, wherein said closed end of said second sleeve and said second axial end of said plug each has a knurled outer surface.

5. The article of clothing according to claim 1, wherein said closed end of said second sleeve includes a disc defining the first diameter, and wherein the second sleeve includes means for maintaining an axial position of the at least one strap on said second sleeve, said means for maintaining including said disc and said flange-shaped rim portion of said second sleeve.

6. The article of clothing according to claim 1, wherein said second sleeve and said plug each includes a radially extending through bore, said plug being slidably received in said second sleeve between first and second positions, said radially extending through bores being aligned when said plug is in said first position and being non-aligned when said plug is in said second position.

7. The article of clothing according to claim 6, wherein said closed end of said second sleeve and said second axial end of said plug each has a knurled outer surface.

8. The article of clothing according to claim 1, wherein said second sleeve is cylindrical.

9. An article of clothing, comprising:
a first sleeve having a first axial end and a second axial end having a hem, said hem having an open slot, said sleeve having an inner surface and an outer surface;
a locking apparatus comprising:
a draw cord threadably disposed within said hem and extending out of said open slot;
a second sleeve having a first axial end, a second axial end and a body therebetween, said body having an outer surface; and
a plug being slidably received in said second sleeve, said plug having a first axial end disposed within said second sleeve and a second axial end disposed outside of said second sleeve and;

at least one loop-shaped strap connected to said inner surface of said fast sleeve, said at least one loop-shaped strap being disposed about said second sleeve of said locking apparatus to connect said first sleeve to said locking apparatus.

10. The article of clothing according to claim 9, further including a glove attached to the first axial end of said first sleeve.

11. The article of clothing according to claim 9, further including a mitten attached to the first axial end of said first sleeve.

12. The article of clothing according to claim 9, wherein said at least one loop-shaped strap includes first and second straps that are connected to said first sleeve on opposite sides of said open slot.

13. The article of clothing according to claim 12, wherein said second axial end of said plug has a flange-shaped rim portion.

14. The article of clothing according to claim 9, wherein said outer surface of said body has first and second members extending outwardly therefrom.

15. The article of clothing according to claim 14, wherein said at least one loop-shaped strap includes first and second loop-shaped straps each disposed between said first and second members of said second sleeve.

16. The article of clothing according to claim 15, wherein said first and second loop-shaped straps are connected to said first sleeve on opposite sides of said open slot.

17. The article of clothing according to claim 16, further including a glove attached to the first axial end of said first sleeve.

18. The article of clothing according to claim 17, wherein said first axial end of said second sleeve is closed by an end member, and wherein said end member and said second axial end of said plug each has a knurled outer surface.

19. The article of clothing according to claim 16, further including a mitten attached to the first axial end of said first sleeve.

20. The article of clothing according to claim 19, wherein said first axial end of said second sleeve is closed by an end member, and wherein said end member and said second axial end of said plug each has a knurled outer surface.

21. The article of clothing according to claim 15, wherein said first and second members are respectively disposed adjacent said first and second axial ends of said second sleeve.

22. The article of clothing according to claim 14, wherein said second sleeve and said plug each includes a radially extending through bore, and wherein said draw cord is disposed through said bores.

23. The article of clothing according to claim 22, wherein said plug is slidably received in said second sleeve between first and second positions, said radially extending through bores being aligned when said plug is in said first position and being non-aligned when said plug is in said second position.

24. The article of clothing according to claim 14, wherein said first axial end of said second sleeve is closed by an end member, wherein said end member and said second axial end of said plug each has an outer surface, and wherein at least one of the outer surfaces of said end member and said second axial end of said plug is knurled.

25. The article of clothing according to claim 14, wherein said first axial end of said second sleeve is closed by an end member, and wherein said end member and said second axial end of said plug each has a knurled outer surface.

26. The article of clothing according to claim 9, wherein said first axial end of said second sleeve is closed by an end member, wherein said end member and said second axial end of said plug each has an outer surface, and wherein at least one of the outer surfaces of said end member and said second axial end of said plug is knurled.

27. The article of clothing according to claim 9, wherein said first axial end of said second sleeve is closed by an end member, and wherein said end member and said second axial end of said plug each has a knurled outer surface.

28. The article of clothing according to claim 9, wherein said second sleeve includes means for maintaining an axial position of said at least one loop-shaped strap on said second sleeve.

29. An article of clothing, comprising:

a first sleeve having a first axial end and a second axial end, said first sleeve having an inner surface and an outer surface;

at least one loop-shaped strap connected to the inner surface of said first sleeve;

a draw cord disposed about the second axial end of said first sleeve and extending outwardly therefrom; and a locking apparatus that releasably locks the draw cord, the locking apparatus comprising:

a second sleeve having first and second axial ends and a body therebetween, said body having an outer surface, said second sleeve further including first and second members extending outwardly from said outer surface and defining a section of the body between said first and second members that is adapted to receive the at least one loop-shaped strap, said second sleeve further including a first radially extending through bore adapted to receive the draw cord; and a plug that is slidably received in said sleeve, said plug having a first axial end disposed within said sleeve and a second axial end disposed outside of said sleeve.

30. The article of clothing according to claim 29, wherein said second sleeve includes means for maintaining an axial position of the at least one loop-shaped strap on said second sleeve, said means for maintaining including said first and second members.

31. The article of clothing according to claim 29, wherein said plug includes a second radially extending through bore adapted to receive the cord, said plug being slidably received in said second sleeve between first and second positions, said first and second radially extending through bores being aligned when said plug is in said first position and being non-aligned when said plug is in said second position.

32. The article of clothing according to claim 29, wherein said first and second members are distinct flanges such that the section of said second sleeve between said first and second members is open.

33. The article of clothing according to claim 29, wherein said article is a mitten.

34. The article of clothing according to claim 29, wherein said article is a glove.

35. An article of clothing, comprising:

a first sleeve having a first axial end and a second axial end, said first sleeve having an inner surface and an outer surface;

at least one loop-shaped strap connected to the inner surface of said first sleeve;

a draw cord disposed about the second axial end and extending outwardly therefrom; and a locking apparatus that releasably locks the draw cord, the locking apparatus comprising;

a second sleeve having first and second axial ends and a body therebetween, said second sleeve further including a first radially extending through bore adapted to receive the cord;

a plug that is slidably received in said second sleeve, said plug having a first axial end disposed within said second sleeve and a second axial end disposed outside of said second sleeve; and means for maintaining an axial position of the at least one loop-shaped strap on said second sleeve.

36. The article of clothing according to claim 35, wherein said article is a glove.

37. The article of clothing according to claim 35, wherein said article is a mitten.

\* \* \* \* \*